(12) United States Patent
Guo et al.

(10) Patent No.: US 11,633,946 B2
(45) Date of Patent: Apr. 25, 2023

(54) FABRICATION METHOD OF HEXAGONAL BORON NITRIDE (H-BN)-BASED THERMALLY-CONDUCTIVE COMPOSITE FILM

(71) Applicants: Suzhou Kanronics Electronic Technology CO., LTD., Suzhou (CN); Shenzhen HanHua TM Technology Co., LTD., Shenzhen (CN)

(72) Inventors: Mars Guo, Nanyang (CN); Renzheng Chen, Suzhou (CN); Daniel Huang, Shenzhen (CN); Chaoming Wu, Shenzhen (CN)

(73) Assignees: Suzhou Kanronics Electronic Technology CO., LTD., Suzhou (CN); Shenzhen HanHua TM Technology Co., LTD., Shenzhen (CN)

( * ) Notice: Subject to any disclaimer, the term of this patent is extended or adjusted under 35 U.S.C. 154(b) by 0 days.

(21) Appl. No.: 17/838,173

(22) Filed: Jun. 11, 2022

(65) Prior Publication Data

US 2022/0402257 A1 Dec. 22, 2022

(30) Foreign Application Priority Data

Jun. 21, 2021 (CN) .......................... 202110684382.4

(51) Int. Cl.
*B32B 37/02* (2006.01)
*B32B 9/00* (2006.01)
*B32B 37/12* (2006.01)

(52) U.S. Cl.
CPC .............. *B32B 37/02* (2013.01); *B32B 9/007* (2013.01); *B32B 37/12* (2013.01); *B32B 2307/302* (2013.01); *B32B 2307/732* (2013.01)

(58) Field of Classification Search
CPC ......... B32B 37/02; B32B 9/007; B32B 37/12; B32B 2307/302; B32B 2307/732; B32B 37/10; B32B 38/0036; C04B 35/58
See application file for complete search history.

(56) References Cited

U.S. PATENT DOCUMENTS

2016/0281221 A1* 9/2016 Kim .......................... C25B 1/02
2022/0169002 A1* 6/2022 Honda ....................... C09J 5/00

FOREIGN PATENT DOCUMENTS

CN 103895277 A 7/2014
CN 105722375 A * 6/2016
(Continued)

OTHER PUBLICATIONS

CN110815968 (published Feb. 2020) Machine Translation of Description (EPO/Google), made of record by the Information Disclosure Statement filed Sep. 21, 2022. (Year: 2023).*

(Continued)

*Primary Examiner* — Cynthia L Schaller
(74) *Attorney, Agent, or Firm* — Bayramoglu Law Offices LLC

(57) ABSTRACT

A fabrication method of a hexagonal boron nitride (h-BN)-based thermally-conductive composite film includes the following steps: S1. attaching an adhesive layer to an h-BN film carried on a carrier film, and separating the h-BN film from the carrier film to obtain a film in which an adhesive layer side is defined as a side A and an h-BN film side is defined as a side B; S2. attaching an adhesive layer to the side B of the film obtained in S1; S3. pasting a high-power graphite film to the side B of a film obtained in S2; S4. attaching an adhesive layer to the side B of a film obtained in S3; and S5. shaping a film obtained in S4 according to a required size. The present fabrication method is conducive (Continued)

to improving the production efficiency or yield rate of a thermally-conductive film product and the product quality.

10 Claims, 1 Drawing Sheet

(56) References Cited

FOREIGN PATENT DOCUMENTS

| CN | 105949512 A | 9/2016 |
| CN | 110815968 A | 2/2020 |
| CN | 112842972 A | 5/2021 |

OTHER PUBLICATIONS

CN105722375 Machine Translation of Description (EPO/Google) (Year: 2023).*

* cited by examiner

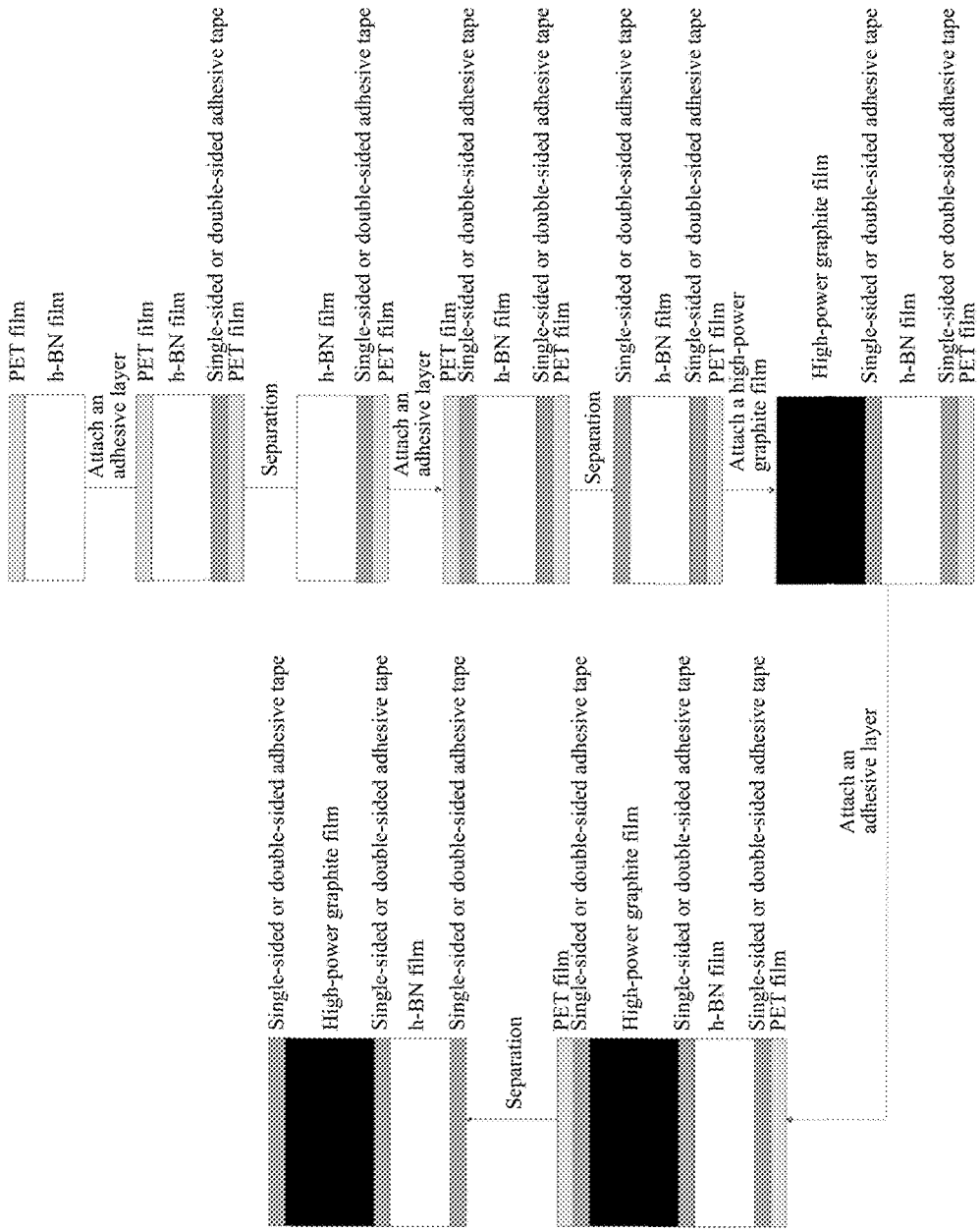

FABRICATION METHOD OF HEXAGONAL BORON NITRIDE (H-BN)-BASED THERMALLY-CONDUCTIVE COMPOSITE FILM

CROSS REFERENCE TO THE RELATED APPLICATIONS

This application is based upon and claims priority to Chinese Patent Application No.: 202110684382.4, filed on Jun. 21, 2021, the entire contents of which are incorporated herein by reference.

TECHNICAL FIELD

The present disclosure relates to the technical field of preparation of thermally-conductive materials, and in particular to a fabrication method of a hexagonal boron nitride (h-BN)-based thermally-conductive composite film.

BACKGROUND h-BN is similar to a hexagonal carbon network in graphite. Nitrogen and boron in h-BN also form hexagonal network layers which overlap each other to form a crystal. Like graphite, the crystal has diamagnetism and high anisotropy; and crystal parameters of the two are quite similar. Similarly, h-BN, like graphite, also has excellent thermal conductivity, heat resistance, and thermal stability, and can be used in the preparation of thermally-conductive materials for electronic products.

At present, there are various technologies for fabricating an h-BN-based thermally-conductive composite film, but the existing technologies generally have the following problems: A complex mold, tool, or special device is required, resulting in too high a cost. A production process is sophisticated and has low production efficiency and low film utilization, which is not suitable for large-scale production. Films generally need to undergo a stripping operation multiple times, during which a composite film is delaminated, resulting in a high defective rate, low yield rate, and reduced average product quality and performance.

SUMMARY

In order to solve the above-mentioned problems of the existing fabrication technologies, the present disclosure provides a fabrication method of an h-BN-based thermally-conductive composite film, including the following steps:

S1. attaching an adhesive layer to an h-BN film carried on a carrier film, and separating the h-BN film from the carrier film to obtain a film in which an adhesive layer side is defined as a side A and an h-BN film side is defined as a side B;

S2. attaching an adhesive layer to the side B of the film obtained in S1;

S3. pasting a high-power graphite film to the side B of a film obtained in S2;

S4. attaching an adhesive layer to the side B of a film obtained in S3; and

S5. shaping a film obtained in S4 according to a required size.

Preferably, the adhesive layer in S1 may come from a single-sided adhesive tape with a polyethylene terephthalate (PET) film or a double-sided adhesive tape with a PET film.

Preferably, the adhesive layer in S2 may come from a single-sided adhesive tape with a PET film or a double-sided adhesive tape with a PET film.

Preferably, in S2, when the adhesive layer attached to the side B comes from a double-sided adhesive tape with a PET film, after the adhesive layer is attached, the PET film on the double-sided adhesive tape at the side B may be separated.

Preferably, the high-power graphite film in S3 may have a PET carrier film or may not have a PET carrier film.

Preferably, in S3, when the high-power graphite film has a PET carrier film, after the high-power graphite film is pasted, the PET carrier film may be separated from the high-power graphite film.

Preferably, the adhesive layer in S4 may come from a single-sided adhesive tape with a PET film or a double-sided adhesive tape with a PET film.

More preferably, the adhesive layer in each step may come from a double-sided adhesive tape with a PET film.

Preferably, a PET film may be exposed at each of the sides A and B of the composite film obtained in S5, which serves as a protective layer; and when the composite film is to be used, the PET films at the two sides may be separated.

Preferably, the carrier film in S1 may be a PET film with a peeling force of 0.2 to 2.2 g/(25 mm).

Preferably, the high-power graphite film may have a PET film with a peeling force of 2.5 to 4.5 g/(25 mm).

Preferably, the PET film on the double-sided adhesive tape may have a peeling force of 0.2 to 5 g/(25 mm); and the double-sided adhesive tape may be black and may have a thickness of 1 μm to 3 μm.

Preferably, in the above steps, the adhesive layers may be attached and the high-power graphite film may be pasted by a rolling process.

Preferably, the rolling process may be conducted with a pressure of 10 MPa to 20 MPa and a roll speed of 0.1 m/s to 0.6 m/s.

Preferably, the h-BN film in S1 may have a thickness of 20 μm to 100 μm; and the high-power graphite film may have a thickness of 30 μm to 300 μm.

Preferably, a thickness $l_2$ of the high-power graphite film may be determined by the following way:

$$l_2 = a \times m \times l_1 \times \frac{l_1}{l_1 + l_2},$$

where h represents a thickness of the h-BN film in S1; a represents an adjustment parameter, which is a constant of 4; and m represents a correction coefficient, which is a constant of 0.3 to 7.

Preferably, in S3, before the high-power graphite film is pasted to the B side of the film, the film may be subjected to a constant-temperature heat treatment at 42° C. to 47° C.; and a method for determining an end time point of the heat treatment may be as follows: when $0.03 < \Delta u(i) < 0.09$, $$\Delta u(i) = K_i \left[ \frac{T_w}{T_z f} f(i-2) + \left( \frac{T_z T_I + T_I^2 + T_w T_I}{T_z T_I} \right) f(i) - \frac{T_z + 2T_w}{T_z} f(i-1) \right],$$

where $\Delta u(i)$ represents a weight change of the film within a time interval corresponding to two concentration tests; K represents a constant of 8 to 13; $f(i)$ represents a deviation of the i-th sampling, $f(i-1)$ represents a deviation of the (i−1)-th sampling, and $f(i-2)$ represents a deviation of the (i−2)-th sampling; $T_z$ represents a sampling period, which is 3 seconds to 5 seconds; $T_I$ represents an integration time, which is 20 seconds to 50 seconds; and $T_w$ represents a differential time, which is 20 seconds to 70 seconds.

Beneficial Effects

The present disclosure has the following beneficial effects.

The fabrication method of the thermally-conductive composite film provided by the present disclosure is conducive to improving the production efficiency or yield rate of a thermally-conductive film product and the product quality. In addition, the fabrication method of the present disclosure can reduce the raw material and energy consumption and fabrication procedures. With high production efficiency, high film utilization, and low raw material consumption, the fabrication method of the present disclosure is suitable for large-scale production. The PET film with a small peeling force is adopted to avoid quality defects such as delamination. A specific film thickness ratio among layers is adopted to seek a balance of various properties of the thermally-conductive film; and a specific heat treatment step is adopted to reduce a gap among layers of the composite film and improve the mechanical properties.

BRIEF DESCRIPTION OF THE DRAWINGS

FIGURE is a schematic diagram illustrating a flow chart of the fabrication method of an h-BN-based thermally-conductive composite film and structures of films in each step provided by the present disclosure.

DETAILED DESCRIPTION OF THE EMBODIMENTS

The implementations of the present disclosure are described below through specific examples, and those skilled in the art can easily understand other advantages and effects of the present disclosure from the contents disclosed in this specification. The present disclosure can also be implemented or applied through other different specific implementations. Based on different viewpoints and applications, various modifications or amendments can be made to various details of this specification without departing from the spirit of the present disclosure.

Unless otherwise specified, the following examples and comparative examples are parallel experiments, which adopt the same treatment steps and parameters.

Example 1 Fabrication of an h-BN-based thermally-conductive composite film

S1. An adhesive layer was attached to an h-BN film carried on a carrier film, and the h-BN film was separated from the carrier film to obtain a film in which an adhesive layer side was defined as a side A and an h-BN film side was defined as a side B;

S2. an adhesive layer was attached to the side B of the film obtained in S1;

S3. a high-power graphite film was pasted to the side B of a film obtained in S2;

S4. an adhesive layer was attached to the side B of a film obtained in S3; and

S5. a film obtained in S4 was shaped according to a required size.

The above adhesive layers were each a coated adhesive layer, and thus a PET film stripping operation was not required.

The high-power graphite film in S3 did not have a PET carrier film, and thus a PET film stripping operation was not required.

In the above steps, the adhesive layers were attached and the high-power graphite film was pasted by a rolling process.

The rolling process was conducted with a pressure of 20 MPa and a roll speed of 0.6 m/s.

The h-BN film in S1 had a thickness of 50 μm; and the high-power graphite film had a thickness of 50 μm.

Example 2 Fabrication of an h-BN-based thermally-conductive composite film

S1. An adhesive layer was attached to an h-BN film carried on a carrier film, and the h-BN film was separated from the carrier film to obtain a film in which an adhesive layer side was defined as a side A and an h-BN film side was defined as a side B;

S2. an adhesive layer was attached to the side B of the film obtained in S1;

S3. a high-power graphite film was pasted to the side B of a film obtained in S2;

S4. an adhesive layer was attached to the side B of a film obtained in S3; and

S5. a film obtained in S4 was shaped according to a required size.

The above adhesive layers each came from a double-sided adhesive tape with a PET film.

In S2, after the adhesive layer was attached, the PET film on the double-sided adhesive tape at the side B was separated.

The high-power graphite film in S3 had a PET carrier film.

In S3, after the high-power graphite film was pasted, the PET carrier film was separated from the high-power graphite film.

A PET film is exposed at each of the sides A and B of the composite film obtained in S5, which serves as a protective layer; and when the composite film is to be used, the PET films at the two sides are separated.

The carrier film in S1 was a PET film with a peeling force of 2.2 g/(25 mm).

The high-power graphite film had a PET film with a peeling force of 4.5 g/(25 mm).

The PET film on the double-sided adhesive tape had a peeling force of 5 g/(25 mm).

In the above steps, the adhesive layers were attached and the high-power graphite film was pasted by a rolling process.

The rolling process was conducted with a pressure of 20 MPa and a roll speed of 0.6 m/s.

The h-BN film in S1 had a thickness of 50 μm; and the high-power graphite film had a thickness of 50 μm.

Example 3 Fabrication of an h-BN-based thermally-conductive composite film

S1. An adhesive layer was attached to an h-BN film carried on a carrier film, and the h-BN film was separated from the carrier film to obtain a film in which an adhesive layer side was defined as a side A and an h-BN film side was defined as a side B;

S2. an adhesive layer was attached to the side B of the film obtained in S1;

S3. a high-power graphite film was pasted to the side B of a film obtained in S2;

S4. an adhesive layer was attached to the side B of a film obtained in S3; and

S5. a film obtained in S4 was shaped according to a required size.

The above adhesive layers each came from a double-sided adhesive tape with a PET film.

In S2, after the adhesive layer was attached, the PET film on the double-sided adhesive tape at the side B was separated.

The high-power graphite film in S3 had a PET carrier film.

In S3, after the high-power graphite film was pasted, the PET carrier film was separated from the high-power graphite film.

A PET film is exposed at each of the sides A and B of the composite film obtained in S5, which serves as a protective layer; and when the composite film is to be used, the PET films at the two sides are separated.

The carrier film in S1 was a PET film with a peeling force of 2.2 g/(25 mm).

The high-power graphite film had a PET film with a peeling force of 4.5 g/(25 mm).

The PET film on the double-sided adhesive tape had a peeling force of 5 g/(25 mm).

In the above steps, the adhesive layers were attached and the high-power graphite film was pasted by a rolling process.

The rolling process was conducted with a pressure of 20 MPa and a roll speed of 0.6 m/s.

The h-BN film in S1 had a thickness of 50 μm. A thickness $l_2$ of the high-power graphite film was determined by the following way:

$$l_2 = a \times m \times l_1 \times \frac{l_1}{l_1 + l_2},$$

where $l_1$ represents a thickness of the h-BN film in S1; a represents an adjustment parameter, which is a constant of 4; and m represents a correction coefficient, which is a constant of 0.3 to 7.

In Example 3, a specific layer thickness relationship was adopted on the basis of Example 2. According to the subsequent performance test results, this example well balances the mechanical properties and the thermal conductivity.

Example 4 Fabrication of an h-BN-based thermally-conductive composite film

S1. An adhesive layer was attached to an h-BN film carried on a carrier film, and the h-BN film was separated from the carrier film to obtain a film in which an adhesive layer side was defined as a side A and an h-BN film side was defined as a side B;

S2. an adhesive layer was attached to the side B of the film obtained in S1;

S3. a high-power graphite film was pasted to the side B of a film obtained in S2;

S4. an adhesive layer was attached to the side B of a film obtained in S3; and

S5. a film obtained in S4 was shaped according to a required size.

The above adhesive layers each came from a double-sided adhesive tape with a PET film.

In S2, after the adhesive layer was attached, the PET film on the double-sided adhesive tape at the side B was separated.

The high-power graphite film in S3 had a PET carrier film.

In S3, after the high-power graphite film was pasted, the PET carrier film was separated from the high-power graphite film.

A PET film is exposed at each of the sides A and B of the composite film obtained in S5, which serves as a protective layer; and when the composite film is to be used, the PET films at the two sides are separated.

The carrier film in S1 was a PET film with a peeling force of 0.2 g/(25 mm).

The high-power graphite film had a PET film with a peeling force of 2.5 g/(25 mm).

The PET film on the double-sided adhesive tape had a peeling force of 0.2 g/(25 mm).

In the above steps, the adhesive layers were attached and the high-power graphite film was pasted by a rolling process.

The rolling process was conducted with a pressure of 10 MPa and a roll speed of 0.1 m/s.

The h-BN film in S1 had a thickness of 100 μm; and the high-power graphite film had a thickness of 300 μm.

Example 5 Fabrication of an h-BN-based thermally-conductive composite film

S1. An adhesive layer was attached to an h-BN film carried on a carrier film, and the h-BN film was separated from the carrier film to obtain a film in which an adhesive layer side was defined as a side A and an h-BN film side was defined as a side B;

S2. an adhesive layer was attached to the side B of the film obtained in S1;

S3. a high-power graphite film was pasted to the side B of a film obtained in S2;

S4. an adhesive layer was attached to the side B of a film obtained in S3; and

S5. a film obtained in S4 was shaped according to a required size.

The above adhesive layers each came from a double-sided adhesive tape with a PET film.

In S2, after the adhesive layer was attached, the PET film on the double-sided adhesive tape at the side B was separated.

The high-power graphite film in S3 had a PET carrier film.

In S3, after the high-power graphite film was pasted, the PET carrier film was separated from the high-power graphite film.

A PET film is exposed at each of the sides A and B of the composite film obtained in S5, which serves as a protective layer; and when the composite film is to be used, the PET films at the two sides are separated.

The carrier film in S1 was a PET film with a peeling force of 0.2 g/(25 mm).

The high-power graphite film had a PET film with a peeling force of 2.5 g/(25 mm).

The PET film on the double-sided adhesive tape had a peeling force of 0.2 g/(25 mm).

In the above steps, the adhesive layers were attached and the high-power graphite film was pasted by a rolling process.

The rolling process was conducted with a pressure of 10 MPa and a roll speed of 0.1 m/s.

The h-BN film in S1 had a thickness of 100 μm.

A thickness $l_2$ of the high-power graphite film was determined by the following way:

$$l_2 = a \times m \times l_1 \times \frac{l_1}{l_1 + l_2},$$

where $l_1$ represents a thickness of the h-BN film in S1; a represents an adjustment parameter, which is a constant of 4; and m represents a correction coefficient, which is a constant of 0.3 to 7.

In Example 5, a specific layer thickness relationship was adopted on the basis of Example 4. According to the subsequent test results, this example well balances the mechanical properties and the thermal conductivity.

Example 6 Fabrication of an h-BN-based thermally-conductive composite film

S1. An adhesive layer was attached to an h-BN film carried on a carrier film, and the h-BN film was separated from the carrier film to obtain a film in which an adhesive layer side was defined as a side A and an h-BN film side was defined as a side B;

S2. an adhesive layer was attached to the side B of the film obtained in S1;

S3. a high-power graphite film was pasted to the side B of a film obtained in S2;

S4. an adhesive layer was attached to the side B of a film obtained in S3; and

S5. a film obtained in S4 was shaped according to a required size.

The above adhesive layers each came from a double-sided adhesive tape with a PET film.

In S2, after the adhesive layer was attached, the PET film on the double-sided adhesive tape at the side B was separated.

The high-power graphite film in S3 had a PET carrier film.

In S3, after the high-power graphite film was pasted, the PET carrier film was separated from the high-power graphite film.

A PET film is exposed at each of the sides A and B of the composite film obtained in S5, which serves as a protective layer; and when the composite film is to be used, the PET films at the two sides are separated.

The carrier film in S1 was a PET film with a peeling force of 0.2 g/(25 mm).

The high-power graphite film had a PET film with a peeling force of 2.5 g/(25 mm).

The PET film on the double-sided adhesive tape had a peeling force of 0.2 g/(25 mm).

In the above steps, the adhesive layers were attached and the high-power graphite film was pasted by a rolling process.

The rolling process was conducted with a pressure of 10 MPa and a roll speed of 0.1 m/s.

The h-BN film in S1 had a thickness of 100 μm.

A thickness $l_2$ of the high-power graphite film was determined by the following way:

$$l_2 = a \times m \times l_1 \times \frac{l_1}{l_1 + l_2},$$

where $l_1$ represents a thickness of the h-BN film in S1; a represents an adjustment parameter, which is a constant of 4; and m represents a correction coefficient, which is a constant of 0.3 to 7.

In S3, before the high-power graphite film was pasted to the B side of the film, the film was subjected to a constant-temperature heat treatment at 45° C.; and a method for determining an end time point of the heat treatment was as follows: when $0.03 < \Delta u(i) < 0.09$, $$\Delta u(i) = K_i \left[ \frac{T_w}{T_z f} f(i-2) + \left( \frac{T_z T_I + T_I^2 + T_w T_I}{T_z T_I} \right) f(i) - \frac{T_z + 2T_w}{T_z} f(i-1) \right],$$

where $\Delta u(i)$ represents a weight change of the film within a time interval corresponding to two concentration tests; $K_i$ represents a constant of 8 to 13; $f(i)$ represents a deviation of the i-th sampling, $f(i-1)$ represents a deviation of the (i−1)-th sampling, and $f(i-2)$ represents a deviation of the (i−2)-th sampling; $T_z$ represents a sampling period, which is 3 seconds to 5 seconds; $T_I$ represents an integration time, which is 20 seconds to 50 seconds; and $T_w$ represents a differential time, which is 20 seconds to 70 seconds.

The specific heat treatment step and parameters were adopted in this example. According to the subsequent test results, this example reduces a gap among layers of the composite film and improves the mechanical and thermal properties.

Performance test: All samples obtained in the above-mentioned examples were subjected to a performance test, and results were shown in the table below (5 samples were prepared for each example, and the data in the table below showed an average value of test results of the 5 samples).

| Source of sample | Tensile strength (MPa) | Thermal conductivity in X-Y direction (W/mK) | Thermal conductivity in Z direction (W/mK) |
| --- | --- | --- | --- |
| Example 1 | 433 | 725 | 12 |
| Example 2 | 428 | 730 | 12 |
| Example 3 | 453 | FIG. 740 | 13 |
| Example 4 | 477 | 1062 | 15 |
| Example 5 | 489 | 1067 | 15 |
| Example 6 | 512 | 1070 | 16 |

It can be seen from the above table that: There is no significant difference in performance between Examples 1 and 2, indicating that the PET film with a specified peeling force used in the present disclosure can avoid the interlayer separation caused by peeling and the decrease in thermal and mechanical properties. In Example 3, a specific layer thickness relationship is adopted on the basis of Example 2, such that the mechanical properties and the thermal conductivity are well balanced. Example 4 adopts a large layer thickness. According to parameters, the method of the present disclosure is suitable for a large-span layer thickness, and the layer thickness does not negatively affect the film performance, resulting in a wide application field. In Example 5, a specific layer thickness relationship is adopted on the basis of Example 4, such that the mechanical properties and the thermal conductivity are well balanced. The specific heat treatment step and parameters are adopted in Example 6, such that a gap among layers of the composite film is reduced and the mechanical and thermal properties are improved.

The preferred specific implementations and examples of the present disclosure are described in detail above, but the present disclosure is not limited to the above implementations and examples. Within the knowledge of those skilled in the art, various variations can also be made without departing from the concept of the present disclosure.

What is claimed is:

1. A fabrication method of a hexagonal boron nitride (h-BN)-based thermally-conductive composite film, comprising the following steps:
    S1. attaching a first adhesive layer to an h-BN film carried on a carrier film, and separating the h-BN film from the carrier film to obtain a first resulting film, wherein an adhesive layer side of the first resulting film is defined as a first side and an h-BN film side of the first resulting film is defined as a second side;
    S2. attaching a second adhesive layer to the second side of the first resulting film obtained in S1 to obtain a second resulting film;
    S3. pasting a high-power graphite film to the h-BN film side of the second resulting film obtained in S2 to obtain a third resulting film;

S4. attaching a third adhesive layer to a graphite film side of the third resulting film obtained in S3 to obtain a fourth resulting film; and S5. shaping the fourth resulting film obtained in S4 according to a required size to obtain the h-BN-based thermally-conductive composite film.

2. The fabrication method of the h-BN-based thermally-conductive composite film according to claim 1, wherein the first adhesive layer in S1 comprises a first single-sided adhesive tape with a polyethylene terephthalate (PET) film or a first double-sided adhesive tape with the PET film; the second adhesive layer in S2 comprises a second single-sided adhesive tape with the PET film or a second double-sided adhesive tape with the PET film; and the third adhesive layer in S4 comprises a third single-sided adhesive tape with the PET film or a third double-sided adhesive tape with the PET film.

3. The fabrication method of the h-BN-based thermally-conductive composite film according to claim 1, wherein in S2, the second adhesive layer attached to the second side comprises a single-sided or double-sided adhesive tape with a PET film, and after the second adhesive layer is attached, the PET film on the single-sided or double-sided adhesive tape at the second side is separated.

4. The fabrication method of the h-BN-based thermally-conductive composite film according to claim 1, wherein the high-power graphite film in S3 has a PET carrier film or does not have a PET carrier film.

5. The fabrication method of the h-BN-based thermally-conductive composite film according to claim 1, wherein in S3, when the high-power graphite film has a PET carrier film, after the high-power graphite film is pasted, the PET carrier film is separated from the high-power graphite film.

6. The fabrication method of the h-BN-based thermally-conductive composite film according to claim 1, wherein a PET film is exposed at each of the first adhesive layer and the third adhesive layer of the h-BN-based thermally-conductive composite film obtained in S5, wherein the PET film serves as a protective layer, and the PET film at each of the adhesive layer side and the h-BN film side of the h-BN-based thermally-conductive composite film are separated prior to using the h-BN-based thermally conductive composite film.

7. The fabrication method of the h-BN-based thermally-conductive composite film according to claim 1, wherein each of the first adhesive layer, the second adhesive layer, and the third adhesive layer comprises a double-sided adhesive tape with a PET film; wherein the second adhesive layer of the first resulting film has a second PET film with a peeling force of 0.2 to 2.2 g/(25 mm); the third adhesive layer of the high-power graphite film has a third PET film with a peeling force of 2.5 to 4.5 g/(25 mm); and the first adhesive layer of the composite film has a first PET film with a peeling force of 0.2 to 5 g/(25 mm).

8. The fabrication method of the h-BN-based thermally-conductive composite film according to claim 1, wherein the high-power graphite film is pasted by a rolling process with a pressure of 10 MPa to 20 MPa and a roll speed of 0.1 m/s to 0.6 m/s.

9. The fabrication method of the h-BN-based thermally-conductive composite film according to claim 1, wherein a thickness $l_2$ of the high-power graphite film is determined by:

$$l_2 = a \times m \times l_1 \times \frac{l_1}{l_1 + l_2},$$

wherein $l_1$ represents a thickness of the h-BN film in S1; a represents an adjustment parameter, and the adjustment parameter a is a constant of 4; and m represents a correction coefficient, and the correction coefficient m is a constant of 0.3 to 7.

10. The fabrication method of the h-BN-based thermally-conductive composite film according to claim 1, wherein in S3, before the high-power graphite film is pasted to the h-BN film side of the second resulting film, the second resulting film is subjected to a constant-temperature heat treatment at 42° C. to 47° C.; and a method for determining an end time point of the constant-temperature heat treatment is as follows: when $0.03 < \Delta u(i) < 0.09$, $$\Delta u(i) = K_i \left[ \frac{T_w}{T_z f} f(i-2) + \left( \frac{T_z T_I + T_I^2 + T_w T_I}{T_z T_I} \right) f(i) - \frac{T_z + 2T_w}{T_z} f(i-1) \right],$$

wherein $\Delta u(i)$ represents a weight change of the second resulting film within a time interval corresponding to two concentration tests; $K_i$ represents a constant of 8 to 13; $f(i)$ represents a deviation of an i-th sampling, $f(i-1)$ represents a deviation of an (i-1)-th sampling, and $f(i-2)$ represents a deviation of an (i-2)-th sampling; $T_z$ represents a sampling period of 3 seconds to 5 seconds; $T_I$ represents an integration time of 20 seconds to 50 seconds; and $T_w$ represents a differential time of 20 seconds to 70 seconds.

* * * * *